(12) United States Patent
Yuan et al.

(10) Patent No.: US 11,493,656 B1
(45) Date of Patent: Nov. 8, 2022

(54) FULL PROBABILITY-BASED SEISMIC RISK ANALYSIS METHOD FOR TUNNEL UNDER FAULT DISLOCATION

(71) Applicant: Southwest Jiaotong University, Chengdu (CN)

(72) Inventors: Ran Yuan, Chengdu (CN); Yin Cheng, Chengdu (CN); Liping Wang, Chengdu (CN); Chaolie Ning, Chengdu (CN); Xiaohui Yu, Chengdu (CN); Wenwen Luo, Chengdu (CN); Wenqi Du, Chengdu (CN); Shuoyu Liu, Chengdu (CN); Jun Du, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 17/737,037

(22) Filed: May 5, 2022

(30) Foreign Application Priority Data

May 6, 2021 (CN) .......................... 202110490629.9

(51) Int. Cl.
*G01V 1/30* (2006.01)
*G06F 30/23* (2020.01)
*G06F 111/10* (2020.01)

(52) U.S. Cl.
CPC .............. *G01V 1/301* (2013.01); *G06F 30/23* (2020.01); *G01V 2210/642* (2013.01); *G06F 2111/10* (2020.01)

(58) Field of Classification Search
CPC ................................ G01V 1/301; G06F 30/23
See application file for complete search history.

(56) References Cited

FOREIGN PATENT DOCUMENTS

CN        114692090 A    *  4/2022

OTHER PUBLICATIONS

Geller, Earthquake prediction: a critical review, Dept of Earth and Planetary Physics, Faculty of Science, Tokyo University, pp. 425-450 (Year: 1997).*
Ministry of Housing and Urban-Rural Development of the People's Republic of China, GB50011-2010, Code for seismic design of buildings, 2010, pp. 1-272, China Construction Industry Press.
(Continued)

*Primary Examiner* — Lisa E Peters
(74) *Attorney, Agent, or Firm* — Bayramoglu Law Offices LLC

(57) ABSTRACT

A full probability-based seismic risk analysis method for a tunnel under fault dislocation comprises: evaluating a magnitude-frequency relationship of a fault; obtaining a probabilistic seismic risk curve of a fault dislocation; calculating a series of bending moments of a tunnel lining under different fault dislocations; obtaining a series of damage index values $R_M$ of the tunnel; obtaining a vulnerability model of the tunnel damaged by fault dislocation; calculating a probabilistic risk that the tunnel crossing the fault is damaged due to the dislocation of the active fault; obtaining a probability P that the damage state is equal to or higher than a certain damage state within a specified period; and using the results to guide the assessment of the seismic risk of the tunnel crossing the fault. Modeling and analysis can be performed according to the actual situation of the tunnel crossing the fault with different factors.

4 Claims, 5 Drawing Sheets

Tunnel model

(56) References Cited

OTHER PUBLICATIONS

China Merchants Chongqing Transportation Research and Design Institute Co., Ltd., JTGD70-2-2014, Specifications for Design of Highway Tunnels Section 2 Traffic Engineering and Affiliated Facilities, 2014, pp. 1-83, People's Communications Publishing House Co., Ltd.

* cited by examiner

FULL PROBABILITY-BASED SEISMIC RISK ANALYSIS METHOD FOR TUNNEL UNDER FAULT DISLOCATION

CROSS REFERENCE TO THE RELATED APPLICATIONS

This application is based upon and claims priority to Chinese Patent Application No. 202110490629.9 filed on May 6, 2021, the entire contents of which are incorporated herein by reference.

TECHNICAL FIELD

The present invention belongs to the technical field of seismic risks of tunnels under fault dislocation, and in particular relates to a full probability-based seismic risk analysis method for a tunnel under fault dislocation.

BACKGROUND

With the acceleration of urbanization development in China, the traffic pressure brought by the rapid growth of urban population is increasing day by day. In order to develop metropolis better and faster, solving the traffic problem bears the brunt. Ground transportation has been far from meeting people's needs. Therefore, underground transportation has become the most promising way to relieve the current traffic pressure in metropolises. Accordingly, domestic metropolises are being vigorously developed at present, for example, shallow buried tunnel structures such as subways are being built all over. Therefore, with the development of economy, the number of underground buildings is increasing. Generally, when the route of a tunnel is designed, crossing a fault should be avoided as much as possible in principle, but sometimes it is unavoidable to cross the fault because of the overall direction of the route.

The technical specifications for seismic design at home and abroad mainly aim at tunnel damage caused by ground motion of earthquakes, measure the degree of structural damage by using ground motion parameter indexes (such as PGA), and specify the damage of fault dislocation to tunnel structures at home. In the Code for Design of Building Structures (GB50011-2010) and the Code for Design of Highway Tunnels (JTGD70-2-2014), the principle of "avoidance and detour" is generally used for design when crossing adverse geological conditions such as active faults. The risk of damage to tunnel structures due to fault dislocation is not assessed.

SUMMARY

In order to overcome the above problems, the present invention provides a full probability-based seismic risk analysis method for a tunnel under fault dislocation.

The technical solution used by the present invention is:

A full probability-based seismic risk analysis method for a tunnel under fault dislocation, including the following steps:

step 1: determining the position, angle, length and type of an active fault that the tunnel passes through, analyzing the seismic activity of the fault, determining a minimum annual occurrence rate of earthquakes in the fault, and evaluating a magnitude-frequency relationship of the fault;

step 2: evaluating the probabilistic seismic risk of a fault dislocation by using an existing fault dislocation (bedrock dislocation or surface dislocation) prediction equation according to formula (1), to obtain a probabilistic seismic hazard curve of the fault dislocation (the x-axis is the maximum surface dislocation of the fault, and the y-axis is the annual exceeding probability corresponding to the dislocation), $$\lambda_D(d) = v \int_M P[D>d|m] \cdot f(m) \cdot dm \quad (1);$$

where in formula (1), $\lambda_D(d)$ is an average annual exceeding rate of the fault dislocation D exceeding a certain threshold d, v is an annual average occurrence rate of earthquakes, $P(D>d|m)$ indicates a conditional probability that the fault dislocation is greater than a given value d when the magnitude is m, and f(m) is a probability density function that the fault can produce the earthquake magnitude of m;

step 3: determining basic working conditions of the tunnel crossing the fault, including an angle between the fault and the tunnel, a buried depth and soil properties of the tunnel, etc., performing three-dimensional modeling on the tunnel crossing the fault by using a finite element model, such as Flac3D or ABAQUS, applying a fault dislocation step by step (for example, 0 m to 1 m, once every 0.01 m), and calculating a series of bending moments of a tunnel lining under different fault dislocations;

step 4: calculating a limit bending moment of the lining of a tunnel segment crossing the fault according to the actual design of the tunnel, and then dividing the series of bending moments obtained in step 3 by the limit bending moment to obtain a series of damage index values $R_M$ of the tunnel (that is, bending moment ratio: actual bending moment/limit bending moment);

step 5: obtaining a vulnerability model of the tunnel damaged by fault dislocation, that is, a relationship between a bending moment ratio in step 4 and a probability of causing the structure to reach different damage states, where the mathematical expression is formula (2):

$$P(DS \geq ds_i | R_M) = \phi\left[\frac{1}{\beta} \cdot \ln\left(\frac{R_M}{\overline{R}_M}\right)\right] \quad (2)$$

where in formula (2), P is a cumulative probability of vulnerability function of the tunnel, which describes the probability that the damage state DS of the tunnel is greater than or equal to a specific damage state $ds_i$ when a tunnel damage index value $R_M$ is given, $\overline{R}_M$ is a median of the damage index, and is a log standard deviation of the damage index;

step 6: based on the probabilistic hazard curve of the dislocation, the damage index value of the tunnel crossing the fault, and the vulnerability model obtained in steps 2-5, calculating, according to formula (3), an annual exceeding rate of different structural damage states of the tunnel crossing the fault under the action of fault dislocation, that is, a probabilistic risk that the tunnel crossing the fault is damaged due to the dislocation of the active fault, $$\lambda_{ds_i} = \int_D P(DS \geq ds_i | R_M = r_M(d,\theta)) |d\lambda_D(d)| \quad (3);$$

where in formula (3), $\lambda_{ds_i}$ is the annual exceeding rate equal to or greater than a target damage state, $P(DS \geq ds_i | R_M = r_M(d, \theta))$ is a conditional probability that the damage state DS of the tunnel is greater than the specific damage state $ds_i$ when the damage index $R_M$ calculated by the finite element model is equal to $r_M$ under given dislocation d and other parameters θ (such as angle and buried depth), that is, a vulnerability function, and $\lambda_D(d)$ is the average annual exceeding rate of the fault dislocation;

step 7: converting, based on the assumption of obeying the Poisson process, the annual exceeding probability λ obtained in step 6 into a probability P that the damage state is equal to or higher than a certain damage state within a specified period (such as a design period), using formula (4):

$$P = 1 - e^{-\lambda t} \quad (4);$$

where in formula (4), t is the specified period of the structure, and λ is $\lambda_{ds_i}$ in formula (3); and step 8: using the results of steps 6 and 7 to guide the assessment of the seismic risk of the tunnel crossing the fault.

The present invention has the following advantages:

1. At present, the technical specifications for seismic design at home and abroad mainly aim at the damage to tunnels caused by the ground motion of earthquakes, and the specifications on the damage to tunnel structures caused by the fault dislocation are still unclear. This solution proposes a full probability-based seismic risk analysis method for a tunnel under fault dislocation, which fills the gap in this aspect and quantifies the seismic risk of the tunnel to facilitate application.

2. In the calculation solution, modeling and analysis can be performed according to the actual situation of the tunnel crossing the fault, and the influence of different factors, such as a buried depth of the tunnel, an angle between the tunnel strike and the fault strike, and a bedrock overburden thickness can be considered by numerical simulation, so that the risk calculation is more reasonable.

DETAILED DESCRIPTION OF THE EMBODIMENTS

The present invention is further described below, but the present invention is not limited thereto.

Example

A tunnel that passes through a strike-slip fault having a width of 31 km and a length of 50 km is known. Seismicity information of the fault: the upper limit of the earthquake magnitude is 7, the lower limit is 5, and the b value is 0.83. The tunnel has a lining thickness of 0.6 m and a burial depth of 20 m, and the angle between the tunnel strike and the fault strike is 90°; the tunnel has a weight of 25 kN*m$^{-3}$, an elastic modulus of 33.5 GPa, and a Poisson's ratio of 0.2. Soil layers have a weight of 20 kN*m$^{-3}$, an elastic modulus of 0.55 GPa, a Poisson's ratio of 0.3, and a cohesion of 0.25 MPa. The fault soil layer at an internal friction angle 22° has a weight of 19 kN*m$^{-3}$, an elastic modulus of 0.35 GPa, a Poisson's ratio of 0.35, a cohesion of 0.1 MPa, and an internal friction angle of 20°.

Figure 1:
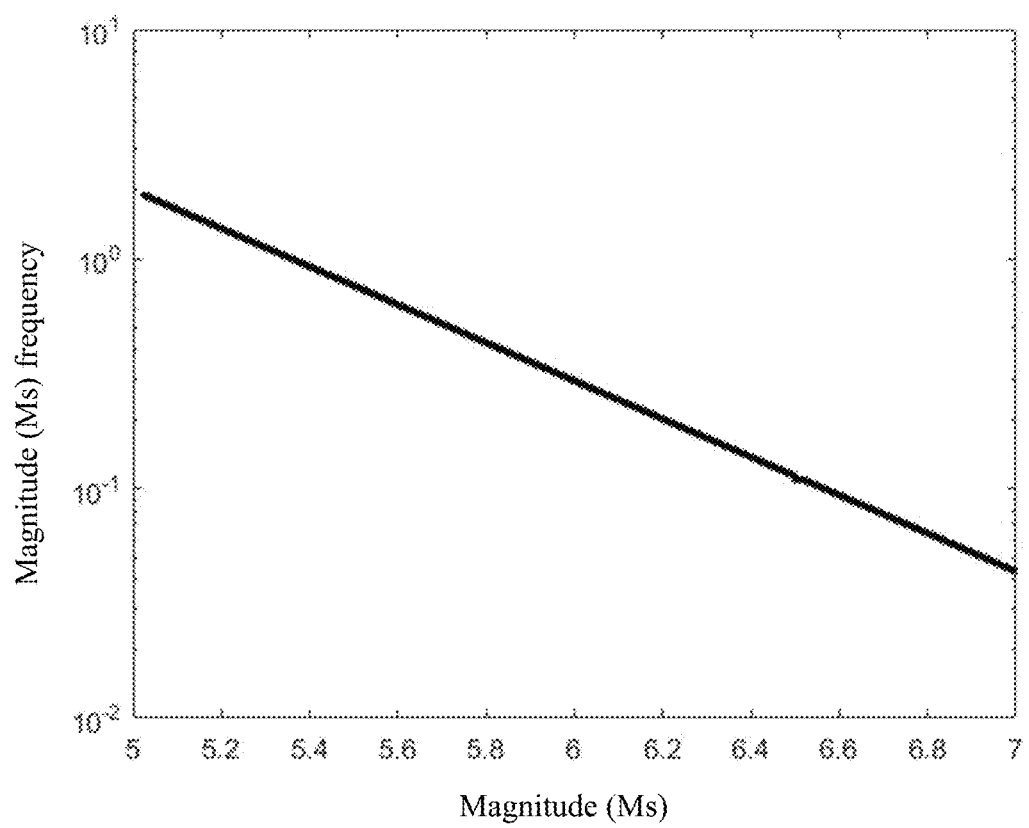
FIG. 1 is an example magnitude and frequency relation diagram of a full probability-based seismic risk analysis method for a tunnel under fault dislocation according to the present invention.

Calculate:

Step 1): the annual average occurrence rate $V_5$ of earthquakes is 0.56, and the obtained relationship between magnitude and frequency is as shown in FIG. 1;

Step 2): fault dislocation prediction equation: lgD=1.0267*M−7.3973;

A probabilistic cut-off model is $$f(m) = \begin{cases} \dfrac{\beta \exp[-\beta(m_u - m_0)]}{1 - \exp[-\beta(m_u - m_0)]} & (m_0 \le m \le m_u) \\ 0 & \text{(other)} \end{cases}$$

Figure 2:
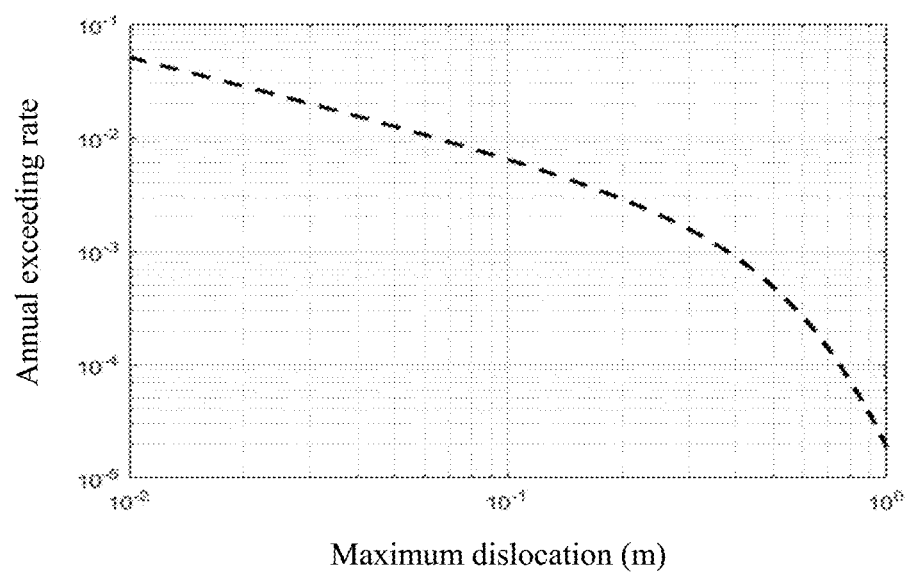
FIG. 2 is a schematic diagram of an example hazard curve of the full probability-based seismic risk analysis method for a tunnel under fault dislocation according to the present invention.
Figure 3:
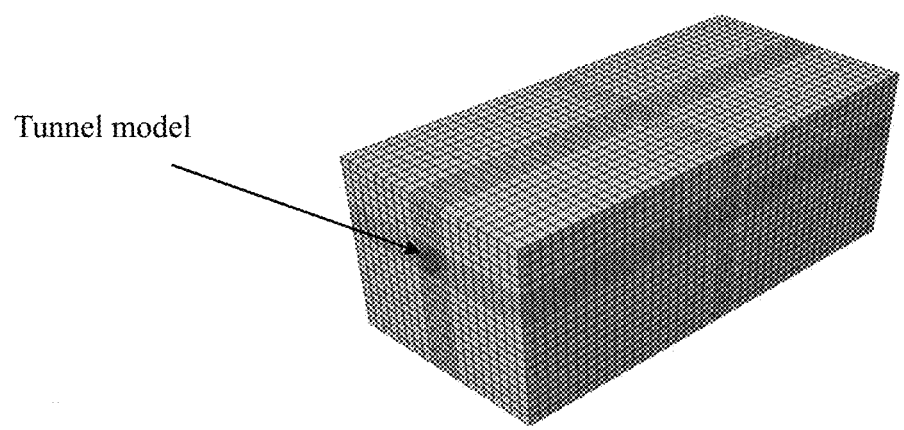
FIG. 3 is an example finite element model diagram of the full probability-based seismic risk analysis method for a tunnel under fault dislocation according to the present invention.
Figure 4:
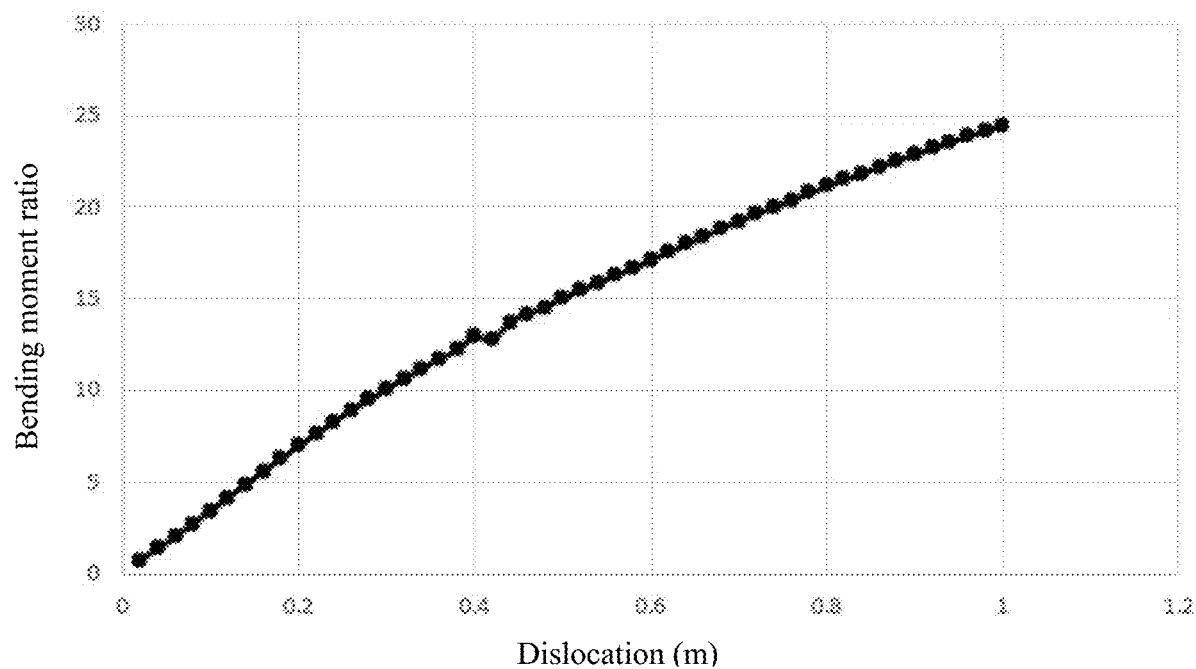
FIG. 4 is an example dislocation and bending moment ratio diagram of the full probability-based seismic risk analysis method for a tunnel under fault dislocation according to the present invention.
Figure 5:
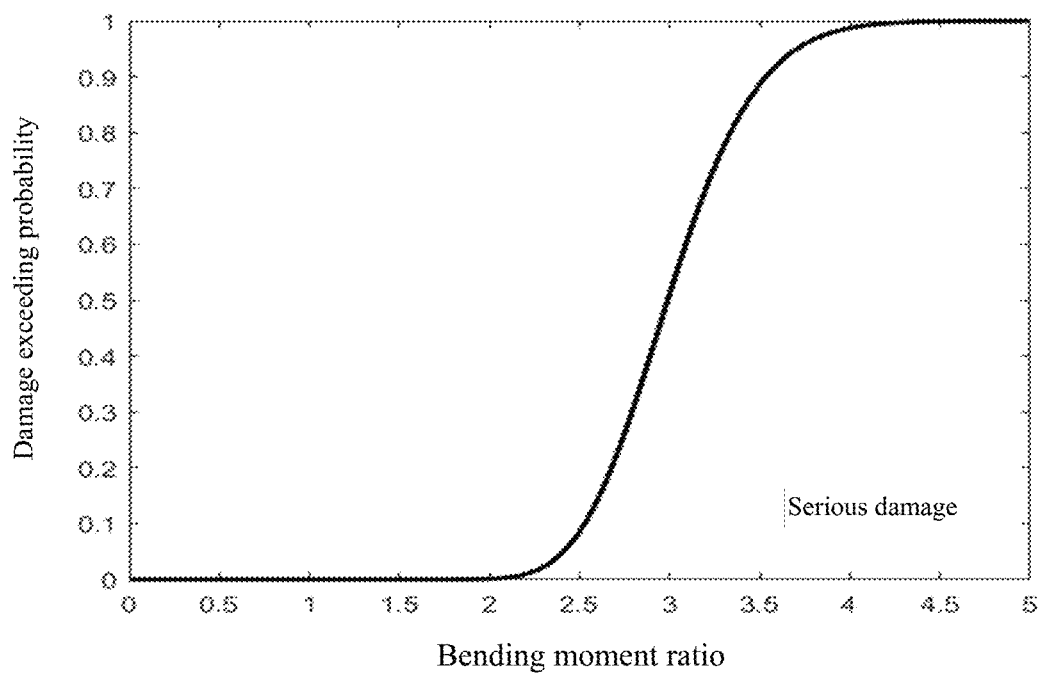
FIG. 5 is a schematic diagram of an example vulnerability curve of serious structure damage in the full probability-based seismic risk analysis method for a tunnel under fault dislocation according to the present invention.

Parameters are brought into formula (1) to obtain a risk curve, as shown in FIG. 2;

Step 3): establish an ABAQUS finite element model, as shown in FIG. 3;

Step 4): find the relationship between the dislocation and the bending moment ratio, as shown in FIG. 4;

Step 5): obtain a vulnerability curve, as shown in FIG. 5, and obtain vulnerability curve information, as shown in Table 1;

TABLE 1

Mean and variance table of vulnerability curve

| Damage level | Mean | Variance |
|---|---|---|
| Serious damage | 2,9883 | 0,13075 |

Step 6): according to the information obtained in steps 2-5, using formula (3), calculate the annual exceeding rate of serious damage to the tunnel crossing the fault: $\lambda_{ds}$=0.005;

Step 7): based on formula (4), the probability of serious damage to the tunnel crossing the fault is P=39.4% when the specified period is 100 years.

It should be noted that those of ordinary skill in the art may further make variations and improvements without departing from the conception of the present invention, and the variations and improvements all fall within the protection scope of the present invention.

The invention claimed is:

1. A full probability-based seismic risk analysis method for a tunnel under a fault dislocation, comprises:
   step 1: determining a position, an angle, a length, and a type of an active fault that the tunnel passes through, analyzing a seismic activity of the fault, determining a minimum annual occurrence rate of earthquakes in the fault, and evaluating a magnitude-frequency relationship of the fault;
   step 2: evaluating a probabilistic seismic hazard of the fault dislocation by using an existing fault dislocation prediction equation according to formula (1), to obtain a probabilistic seismic hazard curve of the fault dislocation, $$\lambda_D(d) = v \int_M P[D > d | m] \cdot f(m) \cdot dm \quad (1);$$

where in formula (1), $\lambda_D(d)$ is an average annual exceeding rate of the fault dislocation D exceeding a certain threshold d, v is an annual average occurrence rate of earthquakes, M is an earthquake magnitude, P(D>d|m) indicates a conditional probability that the fault dislocation is greater than a given value d when the earthquake magnitude is m, and f(m) is a probability density function that the fault can produce the earthquake magnitude of m;

step 3: determining basic working conditions of the tunnel crossing the fault, including an angle between the fault and the tunnel and a buried depth and soil properties of the tunnel, performing three-dimensional modeling on the tunnel crossing the fault by using a finite element model, applying the fault dislocation step by step, and calculating a series of bending moments of a tunnel lining under different fault dislocation values;

step 4: calculating a limit bending moment of the lining of a tunnel segment crossing the fault according to an actual design of the tunnel, and then dividing the series of bending moments obtained in step 3 by the limit bending moment to obtain a series of damage index values $R_M$ of the tunnel;

step 5: obtaining a vulnerability model of the tunnel damaged by the fault dislocation, that is, a relationship between a bending moment ratio in step 4 and a probability of causing a structure to reach different damage states, where the mathematical expression is formula (2):

$$P(DS \geq ds_i | R_M) = \phi\left[\frac{1}{\beta} \cdot \ln\left(\frac{R_M}{\overline{R_M}}\right)\right]; \quad (2)$$

where in formula (2), P is a cumulative vulnerability probability function of the tunnel, which describes a probability that a damage state DS of the tunnel is greater than or equal to a specific damage state $ds_i$ when a damage index value $R_M$ of the tunnel is given, $\overline{R_M}$ is a median of the damage index value, $\beta$ is a log standard deviation of the damage index value, and $\phi$ indicates a standard normal cumulative distribution function;

step 6: based on the probabilistic seismic hazard curve of the fault dislocation, the damage index value of the tunnel crossing the fault, and the vulnerability model obtained in steps 2-5, calculating, according to formula (3), an annual exceeding rate of different structural damage states of the tunnel crossing the fault under an action of the fault dislocation, that is, a probabilistic risk that the tunnel crossing the fault is damaged due to a dislocation of the active fault, $$\lambda_{ds_i} = \int_D P(DS \geq ds_i | R_M = r_M(d,\theta)) | d\lambda_D(d) | \quad (3);$$

where in formula (3), $\lambda_{ds_i}$ is the annual exceeding rate equal to or greater than a target damage state, $P(DS \geq ds_i | R_M = r_M(d, \theta))$ is a conditional probability that the damage state DS of the tunnel is greater than the specific damage state $ds_i$ when the damage index value $R_M$ calculated by the finite element model is equal to $r_M$ under a given dislocation d and other parameters $\theta$ (including the angle between the fault and the tunnel and the buried depth of the tunnel), that is, a vulnerability function, and $\lambda_D$ (d) is the average annual exceeding rate of the fault dislocation;

step 7: converting, based on an assumption of obeying an Poisson process, the annual exceeding rate obtained in step 6 into a probability P that the damage state is equal to or higher than a certain damage state within a specified period, using formula (4):

$$P = 1 - e^{-\lambda t} \quad (4);$$

where in formula (4), t is the specified period of the structure, and $\lambda$ is $\lambda_{ds_i}$ in formula (3); and step 8: using the results of steps 6 and 7 to guide an assessment of the seismic risk of the tunnel crossing the fault.

2. The full probability-based seismic risk analysis method for the tunnel under the fault dislocation according to claim 1, wherein in step 2, the fault dislocation is a bedrock dislocation or a surface dislocation; and wherein x-axis of the hazard curve is a maximum surface dislocation of the fault, and y-axis of the hazard curve is the annual exceeding rate corresponding to the dislocation.

3. The full probability-based seismic risk analysis method for the tunnel under the fault dislocation according to claim 1, wherein in step 3, the finite element model is Flac3D or ABAQUS; a range of applying the fault dislocation step by step is 0 m to 1 m, once every 0.01 m; and $R_M$ is the bending moment ratio equated to an actual bending moment divided by the limit bending moment.

4. The full probability-based seismic risk analysis method for the tunnel under the fault dislocation according to claim 1, wherein in step 7, the specified period is a design period.

* * * * *